United States Patent [19]
Delahunt

[11] 3,967,292
[45] June 29, 1976

[54] FILM ASSEMBLY INCLUDING A HERMETICALLY SEALED BATTERY

[75] Inventor: Robert M. Delahunt, Norwell, Mass.

[73] Assignee: Polaroid Corporation, Cambridge, Mass.

[22] Filed: Dec. 23, 1974

[21] Appl. No.: 535,206

[52] U.S. Cl. .............................. 354/174; 136/111; 354/202; 354/275
[51] Int. Cl.² .................... G03B 17/26; H01M 2/02
[58] Field of Search ............ 354/174, 85, 202, 304, 354/354, 275; 136/111

[56] References Cited
UNITED STATES PATENTS

3,543,662  12/1970  Erlickman ......................... 354/202
3,877,045  4/1975  Bloom et al. .................. 354/174 X Primary Examiner—L. T. Hix
Assistant Examiner—E. M. O'Connor
Attorney, Agent, or Firm—John P. Morley

[57] ABSTRACT

A photographic film assembly which comprises a cassette; a supply of photographic film disposed within the cassette; a battery positioned within the cassette which includes one or more cells containing an aqueous electrolyte possessing an ionizable ammonium salt, and means for hermetically sealing the battery positioned within the cassette to prevent volatile effluvia liberated by the battery from contacting said film units.

10 Claims, 5 Drawing Figures

FILM ASSEMBLY INCLUDING A HERMETICALLY SEALED BATTERY

BACKGROUND OF THE INVENTION

Part 1. The Field of The Invention

This invention relates to photography and more precisely, to photographic film packs or assemblies comprising a container holding self-developing film unit(s) integrated with an electrical power supply system.

Part 2. Description of the Prior Art

U.S. Pat. Nos. 3,705,542; 3,543,663; 3,543,662; 3,595,661 and commonly owned, copending U.S. patent application Ser. No. 399,321, now U.S. Pat. No. 3,877,045, filed Sept. 21, 1973 by S. M. Bloom, J. W. Foley and N. S. Hadzekyriakides relate to photographic film packs comprising an enclosure containing self-developing film units integrated with a power supply system. Such film packs are presently employed exclusively in a photographic camera sold by Polaroid Corporation of Cambridge, Massachusetts, U.S.A. under the trade name "SX-70."

Essentially, film packs described in those Patents and application comprise an opaque enclosure containing a dark slide for covering an exposure station in a forward wall of the container, a stack of individual "self-developing" film units positioned behind the dark slide, means for urging the stack of film units towards the forward wall to position the uppermost film unit in the stack in the exposure station and an electrical power supply system for operating electrical mechanisms of a camera designed for using the pack.

When the film pack is inserted into the camera, the dark slide is removed through a withdrawal slot at one end of the enclosure to uncover the exposure station and the uppermost film unit is urged into position in the exposure station by the means mentioned before which usually involves a spring biased platen.

After exposure, the uppermost film unit is advanced, from the exposure station through the withdrawal slot into engagement with cylindrical rollers and processing of the exposed film unit is initiated as the unit is advanced between the rollers.

"Self-developing film" of such packs is better described as an integral negative-positive film unit having as essential elements, a photosensitive element having a photosensitive system for providing a diffusion transfer image pattern, an image-receiving element, an opacification system and a rupturable container holding a processing composition. The elements are integrated with the unit so that the processing composition can be distributed within the unit to install a diffusion transfer image pattern in the image-receiving element and the pattern is viewable against a reflective background without separation. The film units are adapted for processing outside the camera since effective protection against further exposure is provided by way of the opacification system which in some integral negative-positive film units is integrated with the unit prior to exposure of the photosensitive system while in others, the opacification system is integrated with the unit after exposure. In the preferred integral negative-positive film units, the opacification system comprises a combination of light-absorbing dyes and a light-reflecting material or pigment and this combination is included in the rupturable container and distributed between the photosensitive and image-receiving elements after exposure. Further details relating to the integral negative-positive film units may be found in U.S. Pat. Nos. 3,415,644; 3,415,645; 3,415,646 and 3,647,437 among others.

As mentioned, the film packs of the present invention also include an electrical energy power source contained within the enclosure. Essentially, the power source comprises a battery of the type described in detail in U.S. Pat. Nos. 3,543,662; 3,563,805; 3,617,387 and 3,734,780 among others. Such batteries are flat or planar primary batteries of the LeClanche type including a zinc anode system, a manganese dioxide cathode system and an aqueous electrolyte system generally comprising an aqueous ammonium chloride, zinc chloride and usually a small amount of mercuric chloride. When the film pack is inserted into the camera, the battery integrated therewith is connected to the camera's electrical system to provide the electrical energy sufficient to operate any circuits of the camera which can include an automatic exposure control circuit, a flash mode circuit, film transport circuits and processing mechanism circuit among others. The output of the battery is designed to continue to supply the requisite energy until all film units in the pack are exposed and transported from the camera. At that time, the pack—containing the integral battery—is discarded.

Photographic film packs having an enclosure containing film units integrated with an electrical energy power source represent an important factor in successfully presenting to the public the distinctive features and advantages of the advanced photographic system involving the camera and film units described before. For example, one distinctive advantage of the integration of the battery and the film units involves the positive assurance that the power supply is replenished concurrently with the renewal of the film supply. Further, the integration of the power supply with the film unit permits storage of both the film and battery in the same package prior to use and optimum storage conditions can be controlled and maintained. For example, each film pack is normally hermetically sealed within lighttight, moisture proof packages and these packages can be stored under conditions designed to assure maximum reliability for the performance characteristics desired of the film unit and battery. Equally important, the integration of film units and battery is accomplished in a fashion that does not impose inordinate dimensional or design constraints on the final film pack but instead permits the use of primary batteries which are low in cost and not incompatable with the disposable feature of the pack. Also the integration can be accomplished at acceptably low production costs by way of efficient, high volume, on-line production techniques.

On occassional instances, the above-described film packs have been found deficient in fully providing the desired performance characteristics. This deficiency has been attributed to incomplete or inadequate sealing of the battery components and such deficiencies unfortunately can occasionally occur in any production process despite the use of highly sophisticated techniques and equipment and stringent qualtiy control programs specifically designed to eliminate or minimize such occurences. In any event, it is believed that the deficient sealing permits volatile material generated in the battery such as gaseous ammonia, mercury or water to contact the film units within the pack. In turn, such gaseous products are believed to be capable of adversely affecting the photographic film characteristics and properties such as the film speed and balance shifts.

Commonly owned, copending U.S. patent application Ser. No. 399,321—mentioned before—is directed to a solution for the problem posed by the evolution of gaseous products from batteries integrated with film units. Essentially, the solution presented involves the integration of gas collection means in the pack to capture gaseous effluents from the battery. In a particularly preferred embodiment, a metal salt adapted to form an ammoniate is dispersed in a gas absorbant having an active surface area. The present invention provides another solution for effectively protecting film units positioned in a container with an energy source from any adverse effects that could occur by contact of the units with any gaseous material that may evolve from the energy source.

BRIEF SUMMARY OF THE INVENTION

The essence of the present invention resides in the discovery that adverse effects of gaseous materials that may be evolved from a battery which is positioned within the film pack also containing the film units can be effectively avoided by sealing the battery within particularly defined sealing means and such sealing does not in any way affect or impair the performance characteristics assigned to the battery. Additionally, the sealing means of the present invention can be integrated with the battery in a surprisingly simple and inconvenient fashion without any extensive modification of, or inteference with existing high speed, on line production techniques employed in the fabrication of the film packs.

Essential elements of sealing means of the present invention comprise two laminar assemblies which are sealed together to hermetically encapsulate the battery. The first laminar assembly comprises a relatively thin sheet material preferably paper bonded to a foil sheet which is overcoated with a plastomeric layer which in turn, is provided with an adherent capability at least about the peripheral portions of the plastomeric layer. The second laminar assembly comprises a sheet material—usually a paper stock somewhat heavier than that involved in the first assembly—bonded to a foil sheet overcoated with a plastomeric layer and an adherent capability which preferably is in the form of a continuous layer.

Batteries hermetically sealed between the laminar assemblies described above present improved power sources providing increased assurance and reliability in the performance characteristics desired from such sources in advanced photographic systems. Further, the improved performance characteristics are obtained with minimal cost and inconvenience to existing production techniques involved in the fabrication of such power sources. Other objects and advantages of the present invention will be apparent from the following description of preferred embodiments thereof taken in connection with the attached drawings.

DESCRIPTION OF PREFERRED EMBODIMENTS OF THE INVENTION

Figure 1:
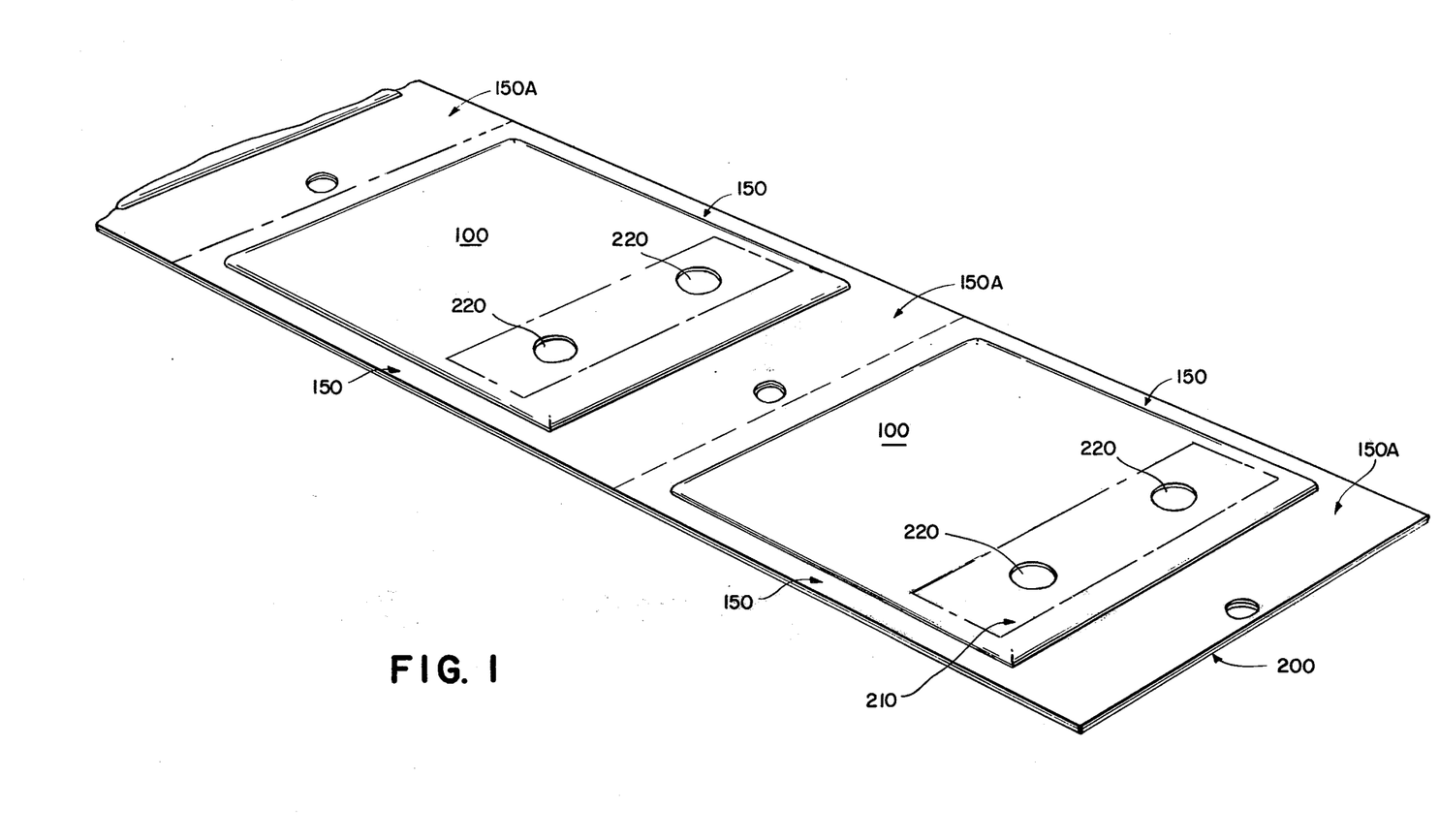
FIG. 1 is a perspective view of a plurality of hermetically sealed batteries fabricated by way of a continuous, high speed production techniques.

Referring first to FIG. 1, a plurality of hermetically sealed batteries are shown sealed by way of a high speed, continuous lamination process. Essentially, each battery is hermetically encapsulated between first laminar assembly 100 and second laminar assembly 200 by sealing the peripheral portions of the assemblies and about sealing area 210 containing apertures providing access to contacts 220. Encapsulation is accomplished by way of specialized, high speed equipment designed to continuously position a laminar battery between rolls of first and second laminar assemblies (100 and 200) so that the battery can be encapsulated between the superposed assemblies by applying the requisite heat or pressure to the portions thereof to be sealed. However, encapsulation of the battery positioned between assemblies 100 and 200 is achieved in a continuous fashion preferably with pairs of opposed rollers employed to heat seal peripheral portions 150 while portions 150A and area 210 are preferably heat sealed by heat stamping techniques. As shown in FIG. 1, sealed area 210 is generally rectangular in shape and provides effective sealing of portions of second laminar assembly 200 about contacts or terminals 220. The shape of sealed area 210 is not especially critical so long as effective sealing about contacts 220 is achieved.

Figure 2:
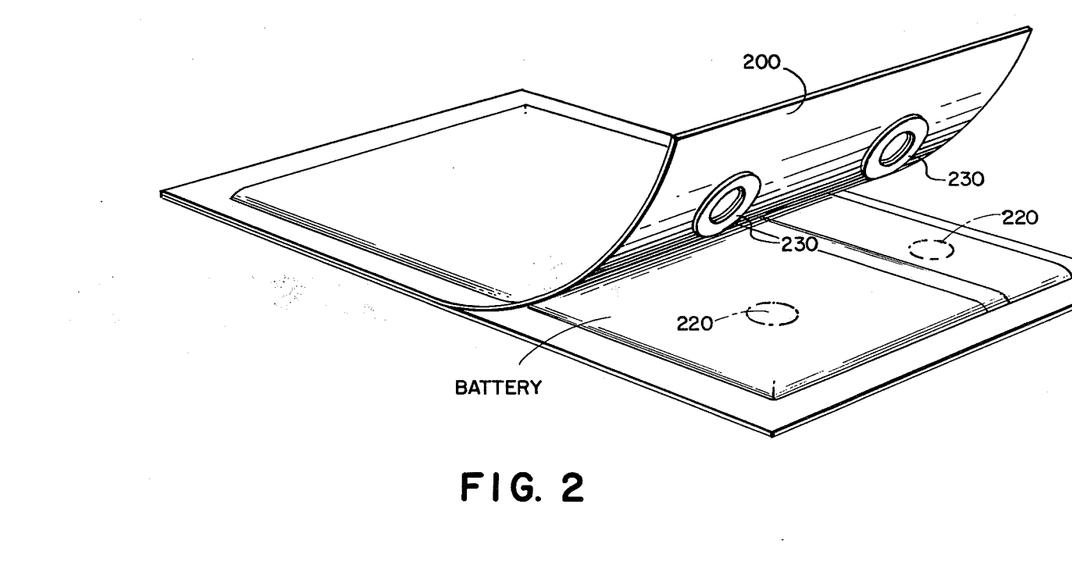
FIG. 2 is a perspective view of a partially encapsulated battery illustrating a particular manner for sealing particular portions of one of the laminar assemblies about portions of the battery.

An especially effective method for assuring effective sealing of second laminar assembly 200 about the area defining contacts 220 is shown in FIG. 2. As shown there, second laminar assembly 200 provides two prepunched apertures for defining the cathode and anode contacts or terminals 220 which are shown disposed adjacent each other on one flat surface of the battery. Circular shaped sealing inserts 230 are shown arranged about the prepunched apertures on second laminar assembly 200 with one surface of sealing insert 230 securely sealed to second laminar assembly 200 while the other surface of sealing means 230 is available for sealing about portions of the surface providing contacts 220.

The respective surfaces of sealing insert 230 providing the adherent capability can have the same or different adhesive so that effective sealing between second assembly 200 and the surface of the battery providing contacts 220 can be achieved. Depending upon the particular circumstances, both surfaces of sealing means 220 can have the same or different type of adhesive, e.g., a heat activatable, moisture activatable or pressure sensitive adhesive. Alternatively, one surface of sealing means 220 can have one type of adhesive, e.g., a pressure sensitive adhesive while the other surface has another type of adhesive, e.g., a heat activatable adhesive thereby providing a feature for assuring effective adhesion between the surface of the second laminar assembly and the surface of the battery should adhesion between these surfaces present peculiar adhesion problems.

Figure 3:
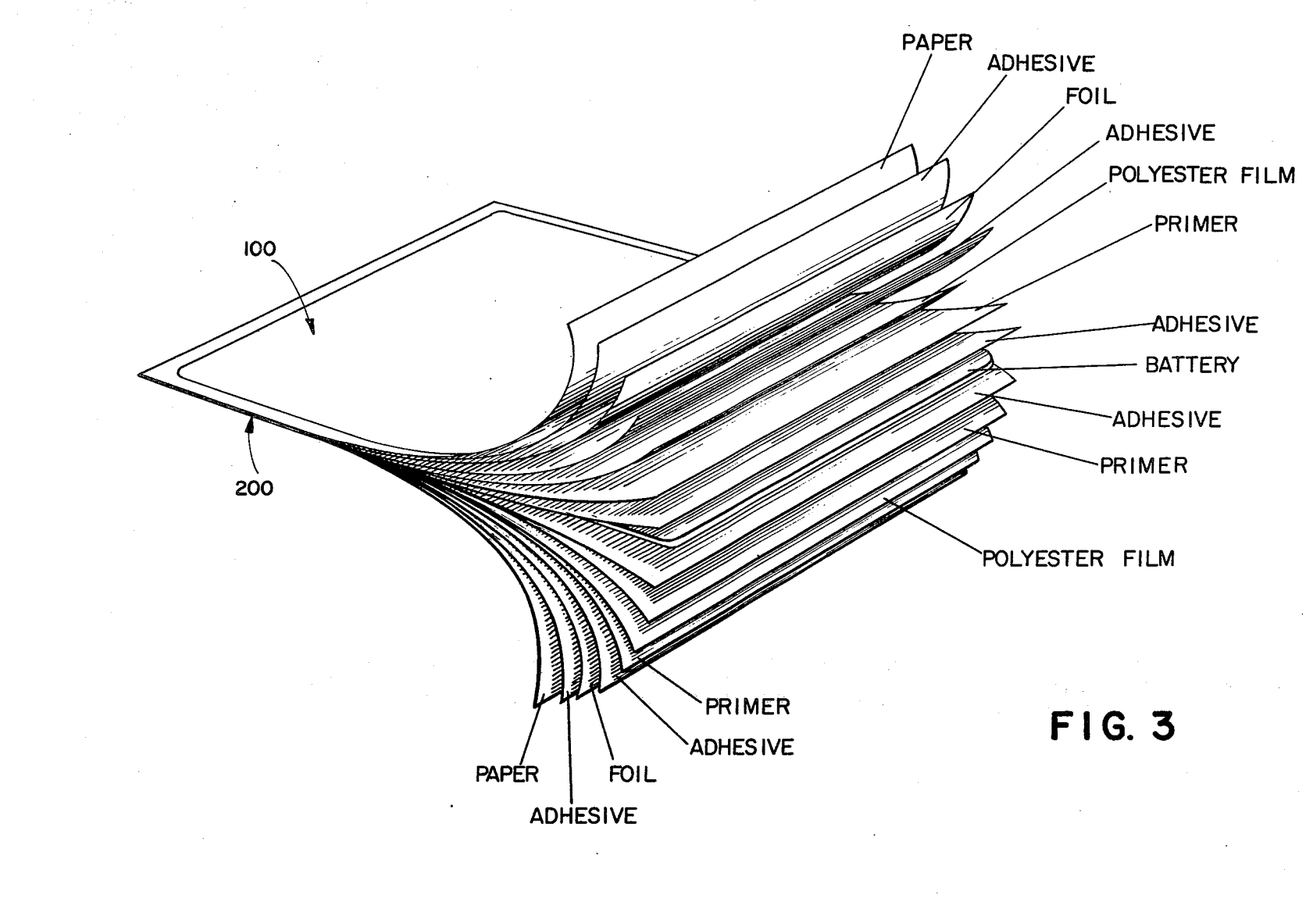
FIG. 3 is an exploded view of the elements of the preferred laminar assemblies employed to hermetically seal a battery.

Details of particular elements of preferred first and second laminar assemblies (100 and 200) will be better appreciated by reference to FIG. 3. As shown there, first laminar assembly 100 comprises a paper stock which can be, for example, a 12 lb. per 3000 ft.$^2$ tissue stock. Coated on the inner surface of the tissue stock is a layer of adhesive preferably a low density polyolefin adhesive providing a layer of about 5 to about 10 lbs. adhesive per 3000 ft.$^2$ to adhere the tissue stock to an aluminum foil sheet which can be in the order of about 0.00035 inch thick. Another layer of polyolefin adhesive similar in composition and thickness to the layer discussed above provides adhesion between the foil sheet and an electrically non conductive plastomeric film preferably a polyester film (Mylar) about 0.0005 inch thick. Finally, a layer of heat activatable adhesive about 1 mil thick is adhered to the plastomeric film by a primer layer. In the especially preferred embodiment of the present invention, the heat activatable adhesive is a commercially available ionomer sold under the trade name "Surlyn."

Second laminar assembly 200 is preferably somewhat thicker than first laminar assembly 100. As shown in FIG. 2, laminar assembly 200 comprises a paper stock which can be a super calandered bleached kraft paper stock of about 50 lbs. per 3000 ft.$^2$. A layer of low density polyolefin adhesive of the composition and thickness described before is employed to adhere the paper stock to a foil sheet material preferably in the order of about 0.0005 inch thick. In turn, another layer of low density polyolefin adhesive overcoated with a primer provides adhesion between the foil sheet material and the electrically non conductive plastomeric layer which as mentioned, is preferably a layer of polyester (Mylar) about 0.005 inch thick. Finally, a primer layer provides suitable adhesion between the plastomeric layer and the layer of heat activatable adhesive, e.g., a layer of Surlyn about 1 ml thick.

Laminar assemblies of the type described above have been found to be especially advantageous in hermetically sealing laminar batteries to effectively protect film units included with the battery in the film packs of the present invention from any adverse affects of gaseous materials that may be evolved from the battery.

Broadly, the laminar batteries involved in the present invention are flat, primary battery structures comprising anode materials, sheet type separator elements, cathode materials and electrolyte combined with sheet type electrically conductive oppositely disposed sheet type current collector elements combined to form a multicell structure.

The preferred battery of the film packs of the present invention comprise a LeClanche electro chemical system including a zinc anode 38 (FIG. 4) and a manganese dioxide cathode 41. The aqueous electrolyte 27 generally comprises an aqueous ammonium chloride/zinc chloride (about 4:1) electrolyte and usually a small amount of mercuric chloride all dispersed in a polymeric binder. The dispersion of electrolyte 27 is applied to or impregnated in central portions of separator 32 and in contact with surface 33 of anode 38 and surface 34 of cathode 41.

Figure 4:
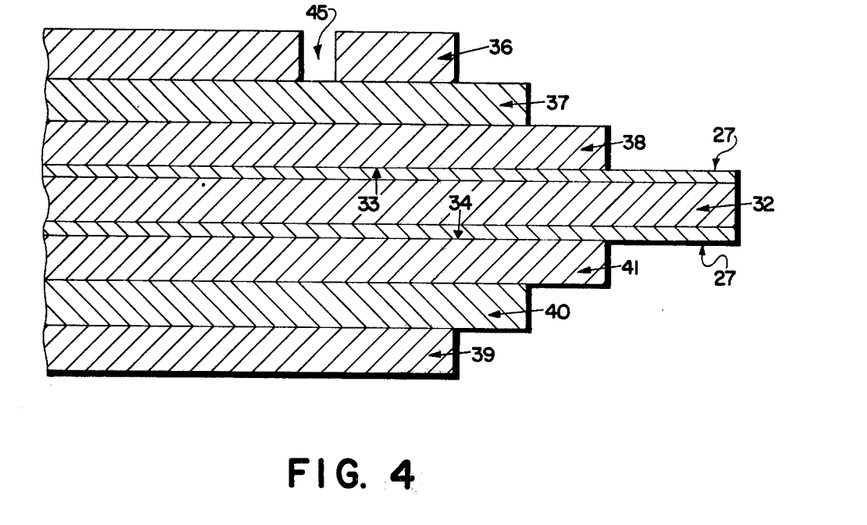
FIG. 4 is a parial cross-sectional view of a battery encapsulated within the sealing means of the present invention and illustrating the essential elements of batteries employed in the photographic film packs of the present invention.

Essential elements of the cells of battery 20 further include metallic sheet current collector 36 having a plurality of gas ports 45 designed to permit efficient transmission of gas generated or liberated within the cell. Metallic current collector 36 is fabricated of aluminum, lead or steel and is arranged in contact with polymeric current collector 37 which comprises a sheet of electrically conductive carbon impregnated, water vapor impermeable thermoplastic polyvinyl chloride film of the type sold under the trade designation "Condulon." Zinc anode 38 comprises active zinc material either as a paste or a zinc sheet secured to polymeric current collector 37. Cathode, metallic sheet current collector 39 can be similar in material and construction to current collector 36 (together with ports 45) while cathode polymeric current collector 40 can be similar to polymeric current collector 37. Cathode 41 comprises an active cathode material such as a manganese dioxide, conductive carbon paste deposited on current collector 40. Edge sealing of the elements of the cell is preferably accomplished in accordance with the manner described in detail in commonly owned U.S. patent application Ser. No. 439,349 filed Feb. 3, 1974. Other details relating to the preferred batteries of the present invention as well as methods of manufacturing same can be found in U.S. application Ser. No. 478,106 filed June 10, 1974 by L. O. Bruneau and U.S. application Ser. No. 478,061 filed June 10, 1974 by R. D. Fanciullo et al. both commonly assigned.

Figure 5:
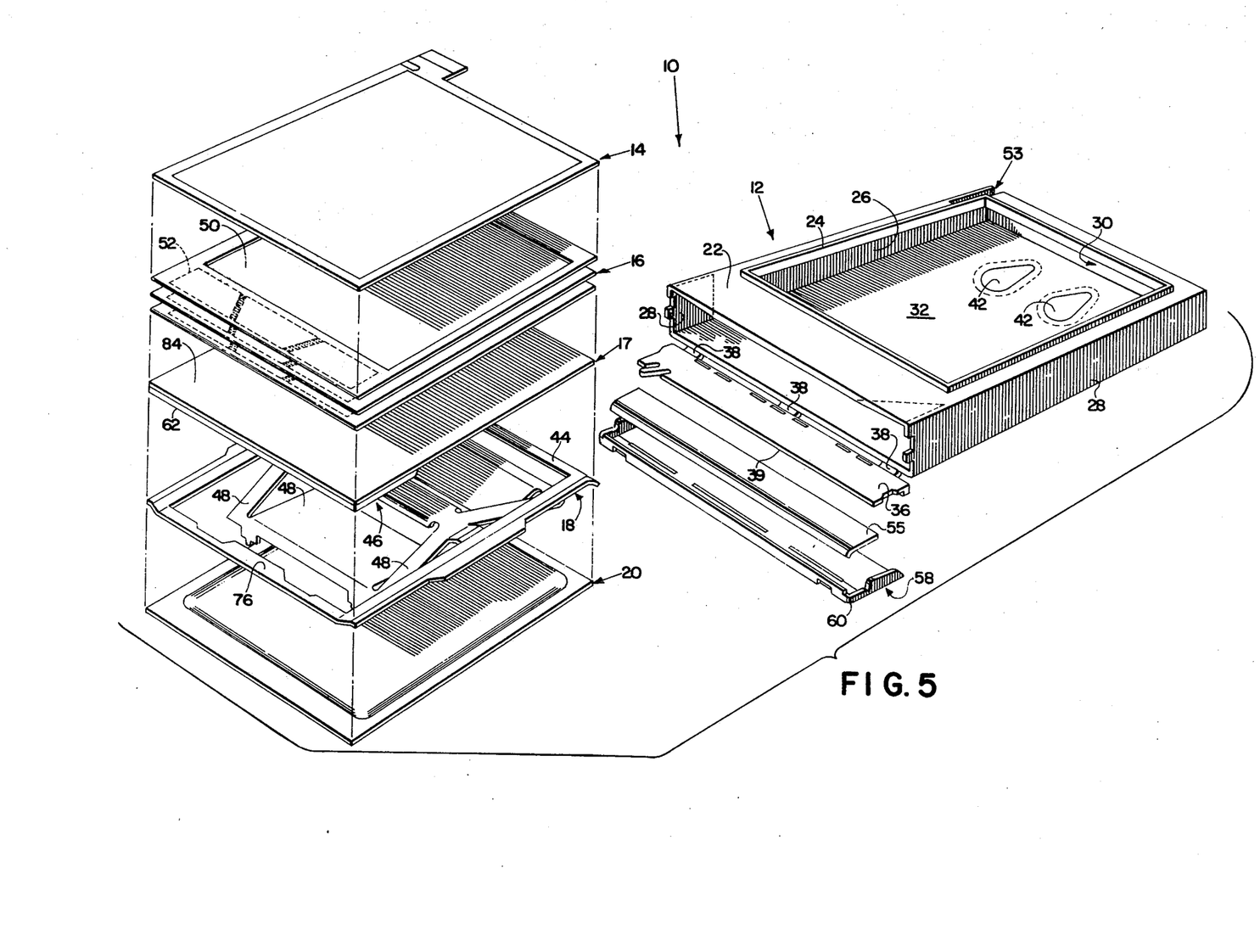
FIG. 5 is an exploded view of elements of the photographic film pack of the present invention showing the construction and arrangement of the elements of the film pack.

The components of a photographic film pack 10 to which the present invention pertains are shown in exploded fashion in FIG. 5 of the drawings. They include a box-like film container 12 and its contents, a dark slide 14, a plurality of self-developing film units 16, a resilient pad member 17, a film support member 18, and electrical battery 20.

Film container 12 is molded of an opaque thermoplastic material, such as polystyrene, and includes relatively thin, substantially planar walls. A forward wall 22 includes a generally rectangular upstanding rib 24 which defines the bounds of a generally rectangular light-transmitting section or exposure aperture 26. Depending from three sides of forward wall 22, respectively, are a pair of side walls 28 and a trailing end wall 30 which serves to space a substantially planar rear wall 32 from forward wall 22.

The leading ends of forward wall 22, side walls 28, and rear wall 32 cooperate to define an elongated rectangular opening 34 at the leading end of container 12 through which the contents may be inserted. After insertion, a leading end wall 36 which is preferably coupled to the leading end or rear wall 32 by integrally formed flexible hinges 38, may be rotated 90° and joined to the leading ends of side walls 28 and rear wall 32 by any suitable method such as ultrasonic welding.

It will be noted that when leading end wall 36 is located in its closed position, its top edge 39 is spaced from the leading end of forward wall 22 such that an elongated withdrawal slot 40 is formed therebetween through which dark slide 14 and film units 16 may be sequentially removed from container 12.

The contents of film container 12 are preferably arranged therein in the stacked relation shown in FIG. 4. Hermetically sealed battery 20 is positioned over the interior surface of rear wall 32 such that two electrodes on the underside of the battery (not shown) are aligned with a pair of tear-drop shaped openings 42 in the rear wall 32. When container 12 is operatively positioned in a suitable camera, a pair of electrical contacts mounted therein are adapted to extend through openings 42 for coupling battery 20 to the camera's electrical system.

Positioned over battery 20 is the film support member or spring biased platen 18. Member 18 preferably includes a generally rectangular platen or open support frame 44 dimensioned to support the peripheral margins of the rearwardmost film unit 16 in the stack. Integrally formed with frame 44 is a generally H-shaped center section 46 which includes resilient spring legs 48 that bear against container rear wall 32 and/or battery 20 to urge platen 44 upwardly.

Resilient pad member 17 is located between frame 44 and the most rearward film unit 16. The film units 16 are integral negative positive film units which are substantially flat and preferably rectangular. They preferably include a rectangular or square photosensitive image-forming area 50, which is surrounded by opaque margins and a rupturable pod or container 52, containing a fluid processing composition, located at the leading end of the film unit outside of the bounds of the image-forming area 50. As mentioned, details relating to suitable film units 16 can be found in U.S. Pat. Nos. 3,415,644; 3,415,645; 3,415,646 and 3,647,437 and the like.

Dark slide 14 is formed of any suitable opaque material such as carboard, paper, or plastic and is intially positioned between the forwardmost film unit 16 and the interior surface of forward wall 22 to light seal exposure aperture 26 and opening 53. Once film container 12 is located at its operative position within a camera, slide 14 may be removed through withdrawal slot 40 in the same manner as the forwardmost film unit 16.

The film units 16 are arranged in stacked relation on top of resilient pad member 17 with their image-forming areas 50 facing towards the exposure aperture 26 in container forward wall 22 and their containers of fluid 52 adjacent end wall 36. Subsequent to the removal of dark slide 14, the forwardmost film unit 16 (closest to wall 22) bears against the interior surface of forward wall 22 and is in position for exposure to actinic radiation transmitted through exposure aperture 26.

It will be noted that after dark slide 14 is removed from container 12 through slot 40, the leading end of the forwardmost film unit 16, containing pod 52, is also aligned with withdrawal slot 40 at the leading end of container 12. Subsequent to exposure, the forwardmost film unit is adapted to be engaged by a film advancing mechanism 85 in the camera and moved out of container 12 through slot 40 in a direction substantially parallel to forward wall 22, for processing. Access for engaging the trailing end of the forwardmost film unit to move it forwardly through slot 40 is provided by an opening 53 located in forward wall 22 and the trailing end wall 30 of container 12.

In order to light seal withdrawal slot 40, container 12 is preferably provide with an opaque flexible sheet 55 which is secured at one end to an exterior surface of leading end wall 36 and is disposed in closing relation to slot 40. This sheet forms a primary light seal for blocking light when container 12 is located within a camera. A secondary light shield for blocking slot 40 prior to inserting container 12 into the camera may also be provided in the form of an end cap member 58. Member 58 is coupled to leading end wall 36 and includes an end cap 60 which is initially positioned in closing relation to the primary light seal 55 and withdrawal slot 40 and may be pivoted to an open position in response to inserting container 12 into the camera. For details as to the construction and operation of end cap member 58, reference may be had to commonly owned copending application of Nicholas Gold, Ser. No. 213,989, filed on Dec. 30, 1971.

From the foregoing description, it will be apparent that the present invention presents to the art distinctive film packs for advanced photographic systems providing improved performance by reason of the integration of encapsulation means with the battery contained in such packs. In addition to hermetically sealing the battery, the laminar assemblies of the encapsulation means are particularly adaptable to high speed, continuous heat lamination techniques. This adaptability is due in part to the integration of the plastomeric layer and the heat activatable adhesive layer with each of the assemblies. This distinctive function of the plastomeric layer and adhesive and advantages obtained therefrom will be better appreciated by referance again to FIG. 1.

As shown in FIG. 1, flat planar batteries are hermetically sealed between first and second laminar assemblies 100 and 200 by the application of heat and pressure to peripheral portions of the assemblies (150 and 150A) and to area 210. Obviously, in such a heat sealing operation maximum bonding efficiency is desired between the assemblies but dimensional constraints are also involved especially in the width of the seals about the peripheral portions of the assembly. In terms of optimum performance characteristics, the heat sealing operation should provide maximum bonding between the assemblies but the width of the peripheral seals should be kept at a minimum especially along portion 150. In turn, one way of minimizing the overall width of the peripheral seal is to seal the assemblies as close to the peripheral portions of the encapsulated battery as possible.

In hermetically sealed products of the present invention, however, the battery to be encapsulated is a flat planar battery having metal current collectors sealed about the other elements of the battery. (See FIG. 4) Under such conditions, encapsulation of batteries of the present invention requires sealing of the laminar assemblies about hard metallic edges defining the periphery of the rectangular battery and the corners of the battery are relatively sharp. Because of these hard edges and especially the relatively sharp corners, sealing of the first and second laminar assemblies close to the edges or corners of the battery can cause cutting or puncturing of one or both of the assemblies and shorting can result.

The encapsulating means of the present invention permits close sealing of the laminar assemblies about the edges of the battery and this sealing can be accomplished in a high speed continuous manner without intolerable cutting or puncturing of either assembly. This accomplishment is considered to be due in part to the integration of the plastomeric layer in each assembly together with the adhesion achieved between the plastomeric layers of each assembly. Essentially, it is believed that the adhesion is such that the plastomeric layers are effectively sealed together but the adhesive provides a degree of resiliency or deformability which in combination with the tough but relatively intractable, dimensionally stable plastomeric layer is sufficient to protect the assembly from puncture or cutting by the metal edges or corners of the battery during sealing and subsequent handling of the assembly.

Accordingly, the present invention presents to the art improved film packs providing an improved degree of reliability in the overall performance characteristics desired of such packs and these improvements are obtained by the integration of relatively inexpensive and simple encapsulation means that can effectively prevent contact between the film units of the pack and gaseous effluents of the battery. At the same time, the integration of the encapsulation means can be obtained without extensive modification of or effect on the high speed, on line production technique desired in the fabrication of such film packs.

Since certain changes may be made in details offered in the above description without departing from the spirit and scope of the invention claimed, all matter contained in the description or shown in the drawings should be considered as illustrative and not in a limiting sense.

What is claimed is:

1. In a photographic film assembly which comprises, in combination:
    a. a photographic film cassette including a withdrawal orifice positioned in a wall of the cassette through which a supply of photographic film is adapted to be selectively withdrawn;
    b. a supply of photographic film positioned in the cassette for selective withdrawal from the cassette through the orifice;
    c. a flat, planar, primary battery positioned in the cassette and including, in combination; anode materials, sheet type separator elements, cathode materials and electrolyte combined with sheet type current collectors all combined to form a multicell structure providing contacts for external connection of said battery;
    the improvement wherein said battery positioned in said cassette is hermetically sealed in sealing means to prevent evolution of gaseous materials from said battery, said sealing means comprising first and second laminar structures each of which comprise a thin fibrous sheet material bonded to a foil sheet material which is bonded to a non-conductive plastomeric sheet material having a heat activatable adhesive capability for providing effective sealing of said laminar assemblies about peripheral portions thereof and about said contacts of said battery.

2. A photographic film assembly of claim 1 wherein said heat activatable adhesive capability comprises a layer of a heat activatable adhesive overcoated on said plastomeric sheet material.

3. A photographic film assembly of claim 1 wherein said plastomeric sheet material comprises a polyester.

4. A photographic film assembly of claim 1 wherein said battery provides anode and cathode contacts disposed adjacent each other on one surface of the battery.

5. A photographic film assembly of claim 1 wherein said laminar assembly which provides sealing about said contacts comprises apertures integrated with a sealing insert for providing sealing of the laminar assembly about said contacts.

6. In a photographic film assembly which comprises, in combination:
    a. a photographic film cassette adapted for enclosing a plurality of photographic film units arranged in stacked relationship and including a forward wall possessing a light-transmitting section to prevent exposure of the forwardmost film unit and a withdrawal opening in one wall of the container permitting selective withdrawal of the film units following exposure thereof;
    b. a plurality of photographic integral negative positive, diffusion transfer film units disposed in stacked relationship within the cassette next adjacent the forward wall;
    c. a flat, planar primary battery positioned in the cassette and including, in combination:
        i. an anode;
        ii. a cathode superposed substantially coextensive the anode;
        iii. A battery separator positioned intermediate and extending at least coextensive the facing surfaces of the anode and the cathode; and
        iv. an electrolyte disposed in contact with the facing surfaces of the anode and the cathode and including an ionizable ammonium salt all combined to form a multicell structure and providing anode and cathode contacts adjacent each other on one surface of said battery;
    the improvement wherein said battery is hermetically sealed between first and second laminar structures each of which comprises a fibrous sheet material bonded to a foil sheet material which is bonded to a non-conductive, plastomeric sheet material having a heat activatable adhesive capability to provide effective sealing about the peripheral portions of said assemblies and about said contacts.

7. A photographic film assembly of claim 6 wherein said laminar assembly which provides sealing about said contacts comprises apertures integrated with a sealing insert for providing sealing of the laminar assembly about said contacts.

8. A photographic film assembly of claim 6 wherein said plastomeric sheet material comprises a polyester.

9. A photographic film assembly of claim 6 wherein the cassette includes spring means biasing the film units towards the forward wall and the battery toward the rear wall.

10. A photographic film assembly of claim 6 including first and second openings in the rear wall of the cassette, the first opening to permit conductor contact with the anode or cathode next adjacent the rear wall and the second opening to permit conductor contact with a conductor disposed in the container in contact with the electrode distal the rear wall.

* * * * *